(12) United States Patent
Ghani

(10) Patent No.: US 8,343,243 B2
(45) Date of Patent: Jan. 1, 2013

(54) METHOD AND APPARATUS FOR BLENDING LIGNITE AND COKE SLURRIES

(75) Inventor: Jaleh Khorami Ghani, Yorba Linda, CA (US)

(73) Assignee: General Electric Company, Schenectady, NY (US)

( * ) Notice: Subject to any disclaimer, the term of this patent is extended or adjusted under 35 U.S.C. 154(b) by 704 days.

(21) Appl. No.: 12/416,050

(22) Filed: Mar. 31, 2009

(65) Prior Publication Data

US 2010/0244448 A1 Sep. 30, 2010

(51) Int. Cl.
*C01B 3/02* (2006.01)
*C10L 5/00* (2006.01)

(52) U.S. Cl. ...... 48/197 R; 44/607; 44/608; 48/197 FM; 252/373

(58) Field of Classification Search ............. 48/197 FM, 48/197 R; 422/224, 225; 366/14, 15; 252/373; 44/607, 608
See application file for complete search history.

(56) References Cited

U.S. PATENT DOCUMENTS

| 3,047,369 | A | * | 7/1962 | Montgomery | 422/164 |
| 3,104,946 | A | * | 9/1963 | Veal | 423/320 |
| 3,275,410 | A | * | 9/1966 | Leatham et al. | 423/164 |
| 3,544,291 | A | * | 12/1970 | Schlinger et al. | 48/206 |
| 3,607,156 | A | * | 9/1971 | Schlinger et al. | 48/206 |
| 4,008,054 | A | * | 2/1977 | Clancey et al. | 44/622 |
| 4,166,802 | A | | 9/1979 | Slater et al. | |
| 4,801,440 | A | * | 1/1989 | Najjar et al. | 423/418.2 |
| 4,808,386 | A | * | 2/1989 | Najjar et al. | 423/226 |
| 4,830,508 | A | * | 5/1989 | Higuchi et al. | 366/141 |
| 4,889,699 | A | * | 12/1989 | Najjar et al. | 423/210 |
| 5,045,087 | A | | 9/1991 | Keller | |
| 5,324,336 | A | * | 6/1994 | Child | 44/608 |
| 5,401,282 | A | * | 3/1995 | Leininger et al. | 48/197 R |
| 5,759,491 | A | * | 6/1998 | Bunin | 422/38 |
| 6,141,796 | A | | 11/2000 | Cummings | |
| 6,676,716 | B2 | * | 1/2004 | Fujimura et al. | 48/197 FM |
| 6,818,190 | B2 | * | 11/2004 | Kawanishi et al. | 422/235 |
| 6,827,912 | B2 | * | 12/2004 | Schingnitz et al. | 422/198 |
| 7,618,558 | B2 | * | 11/2009 | Nielsen | 252/373 |
| 8,002,857 | B2 | * | 8/2011 | Rolland | 48/197 R |
| 2002/0095866 | A1 | * | 7/2002 | Hassett | 48/199 FM |
| 2004/0122188 | A1 | * | 6/2004 | Burns et al. | 526/90 |
| 2007/0044381 | A1 | * | 3/2007 | Holle et al. | 48/197 FM |
| 2007/0119099 | A1 | * | 5/2007 | Wallace | 48/197 FM |
| 2007/0137103 | A1 | * | 6/2007 | Wallace | 48/111 |
| 2009/0013601 | A1 | * | 1/2009 | Mandich et al. | 48/197 FM |

(Continued)

FOREIGN PATENT DOCUMENTS

CA 2536715 2/2007

(Continued)

OTHER PUBLICATIONS

Godwin et al.; Interchange of Metals and Organic Matter Between Water and Subbituminous Coal or lignite Under Simulated Coal Slurry Pipeline Conditions; Environmental Science & Technology; pp. 1100-1104, May 1, 2002.

(Continued)

*Primary Examiner* — Wayne Langel
(74) *Attorney, Agent, or Firm* — Fletcher Yoder, P.C.

(57) ABSTRACT

A method may include preparing a coke slurry, preparing a lignite slurry separate from the coke slurry, and combining the coke slurry with the lignite slurry to form a coke/lignite slurry.

17 Claims, 2 Drawing Sheets

U.S. PATENT DOCUMENTS

| | | | |
|---|---|---|---|
| 2009/0165383 A1* | 7/2009 | Rappas et al. | 48/197 FM |
| 2009/0169449 A1* | 7/2009 | Rappas et al. | 423/207 |
| 2009/0217588 A1* | 9/2009 | Hippo et al. | 48/197 FM |
| 2010/0028236 A1* | 2/2010 | Shen et al. | 423/263 |
| 2010/0083575 A1* | 4/2010 | Varadaraj et al. | 48/209 |
| 2010/0146857 A1* | 6/2010 | Zamansky et al. | 48/197 FM |
| 2010/0162626 A1* | 7/2010 | Clomburg et al. | 48/197 FM |
| 2010/0162627 A1* | 7/2010 | Clomburg et al. | 48/197 FM |

FOREIGN PATENT DOCUMENTS

| | | |
|---|---|---|
| CA | 2535725 | 3/2007 |
| CA | 2537784 | 3/2007 |
| CA | 2537787 | 3/2007 |
| CA | 2534407 | 4/2007 |
| CN | 101323803 | 12/2008 |
| GB | 1507439 | 4/1978 |

OTHER PUBLICATIONS

Clemens; The Role of Lignites in a Hydrogen Energy Economy; 3 pgs.

Marinkovic et al.; Solidification/Stabilization of Power Plants Wastes—Potential Water Pollutants; 8 pgs.

* cited by examiner

METHOD AND APPARATUS FOR BLENDING LIGNITE AND COKE SLURRIES

BACKGROUND OF THE INVENTION

The subject matter disclosed herein relates to coke and lignite gasification. More specifically, disclosed embodiments of the invention relate to preparation of feed slurries prior to gasification.

Fossil fuels, such as coal or petroleum, may be gasified for use in the production of electricity, chemicals, synthetic fuels, or for a variety of other applications. Gasification involves reacting a carbonaceous fuel and oxygen at a very high temperature to produce syngas, a fuel containing carbon monoxide and hydrogen, which burns much more efficiently and cleaner than the fuel in its original state.

Different carbonaceous fuels may be gasified with varying success. That is, a higher heat value generally indicates that a fuel is more easily combustible. The heat value of a material is a measure of the energy released by combustion of the fuel with oxygen. For example, petcoke, which is produced from cracking petroleum, has a relatively high heat value and, therefore, is easily gasified. In contrast, lignite, which has high moisture and high ash content, has a very low heat content and is therefore difficult to gasify. In some instances, lignite contains too much moisture and ash to gasify. However, lignite is much less expensive than coke, which must be derived (i.e., cracked) prior to gasification. Accordingly, it may be desirable to develop a system and process by which lignite and coke may be gasified together.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a method includes preparing a coke slurry, preparing a lignite slurry, and combining the coke slurry with the lignite slurry to form a coke/lignite slurry.

In a second embodiment, a system includes a feedstock preparation and transportation system. The feedstock preparation and transportation system has a first slurry tank for mixing lignite and water to form a lignite slurry, a second slurry tank for mixing coke and water to form a coke slurry, and a third slurry tank for mixing the lignite slurry and the coke slurry to form a coke/lignite slurry.

In a third embodiment, a method includes producing a gasifiable coke/lignite slurry from lignite having a moisture content of at least 29% and an ash content of at least 30%.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

In certain embodiments, the systems and methods described herein include enable gasification of lignite in a coke/lignite slurry. The coke/lignite slurry may be produced by combination of a coke slurry with a lignite slurry. The individual slurries may be produced by separately grinding the coke and lignite and introducing each component to a dedicated slurry tank (e.g., separate first and second slurry tanks). Because lignite is hydrophilic, the lignite slurry may be stabilized (e.g., rested until water is no longer significantly absorbed by the lignite) in the lignite slurry tank before being mixed with the coke slurry in a third slurry tank. After the coke/lignite slurry is stabilized, it may be sent to a gasifier for use, for example, in a power generation system. An exemplary coke/lignite slurry may contain approximately 50% coke slurry and approximately 50% lignite slurry. In another embodiment, an exemplary coke/lignite slurry may contain approximately 60% coke slurry and approximately 40% lignite slurry. Lignite that is otherwise not gasifiable may be gasified using present embodiments, as discussed in detail below. For example, lignite used to produce the lignite slurry may have a moisture content over approximately 29% and an ash content over approximately 30%.

Figure 1:
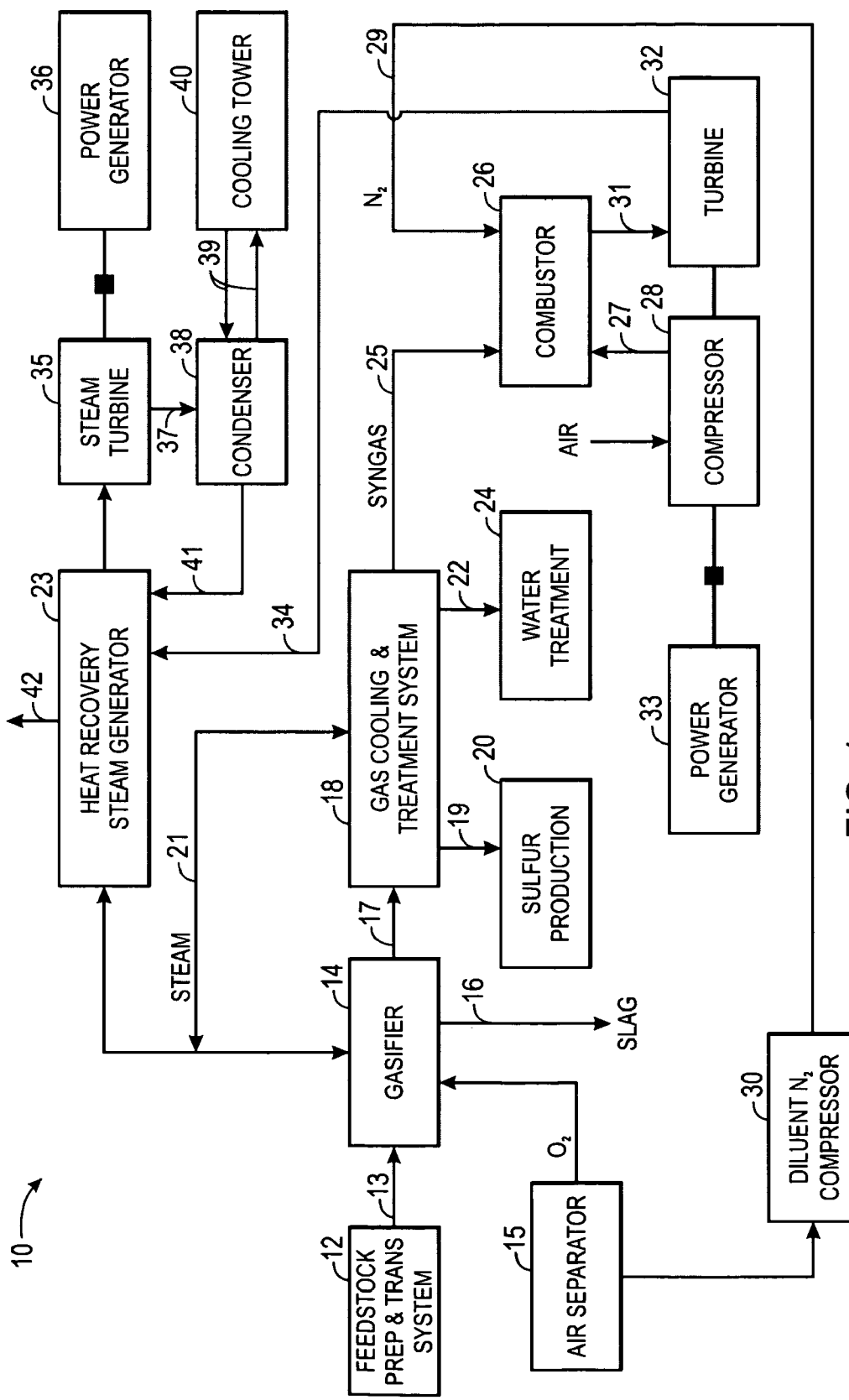
FIG. 1 is a block diagram of an exemplary oxygen blown integrated gasification combined cycle power generation system in accordance with embodiments of the present invention.

FIG. 1 illustrates an exemplary oxygen blown integrated gasification combined cycle (IGCC) power generation system 10. Carbonaceous fuel, such as coke and lignite, may be introduced to the system 10 via a feedstock preparation and transportation system 12, as described in more detail below. The feed system 12 provides fuel slurry 13 to a gasifier 14, where the fuel is mixed with oxygen ($O_2$) and steam ($H_2O$). The oxygen may be provided from an air separator 15. The gasifier 14 heats the reactants to over approximately 700° C. in order to combust the volatile components in the fuel slurry. Due to chemical reactions between the oxygen, steam, and carbon (C), gasification produces hydrogen ($H_2$), carbon monoxide (CO), and carbon dioxide ($CO_2$).

In addition to carbon, coal may contain other components which are less desirable in the combustion process. For example, the different types of coal may contain varying amounts of ash, sulfur, hydrogen, nitrogen, oxygen, and chloride. Many of these components are removed from the system 10 as slag 16 after the gasification process. The remaining components 17 are conveyed from the gasifier 14 to a gas cooling and treating system 18. Sulfur components 19 may be removed from the cooling and treating system 18 and sent to a sulfur production system 20 for purification. Water may be removed from the gas stream as a steam 21 and a liquid 22. The steam 21 may be recycled to the gasifer 14 and/or sent to a heat recovery steam generator (HRSG) 23. The liquid water 22 may be sent to a water treatment system 24.

The gas stream which exits the gas cooling and treating system 18 may be "clean" syngas 25. The syngas 25 may then be carried to a combustor 26, in which the syngas 25 is combusted at a much higher efficiency than the original carbonaceous fuel fed into the feed system 12. Air 27 may also be provided to the combustor 26 from a compressor 28 to mix with the syngas 25 in a fuel air ratio for combustion, and nitrogen 29 may be provided to the combustor 26 from the air separator 15 via a diluent nitrogen compressor 30 to cool the combustion reaction. Exhaust 31 from the combustor 26 may then be fed to a turbine 32, which may drive the compressor 28 and/or an electrical generator 33. Exhaust 34 from the turbine 32 may then be fed to the HRSG 23, which may recover heat from the exhaust 34 and from the steam 21 fed from the gas cooling and treating system 18. The recovered heat may be used to drive a steam turbine 35, which may drive a generator 36 to generate electricity. Steam 37 from the steam turbine 35 may then be carried to a condenser 38. Cooling fluid 39 may be provided to the condenser 38 from a cooling tower 40. Condensed steam 41 from the condenser 38 may then be recycled to the HRSG 23. The HRSG 23 may also have a stack 42 through which pressure may be relieved to the atmosphere.

Figure 2:
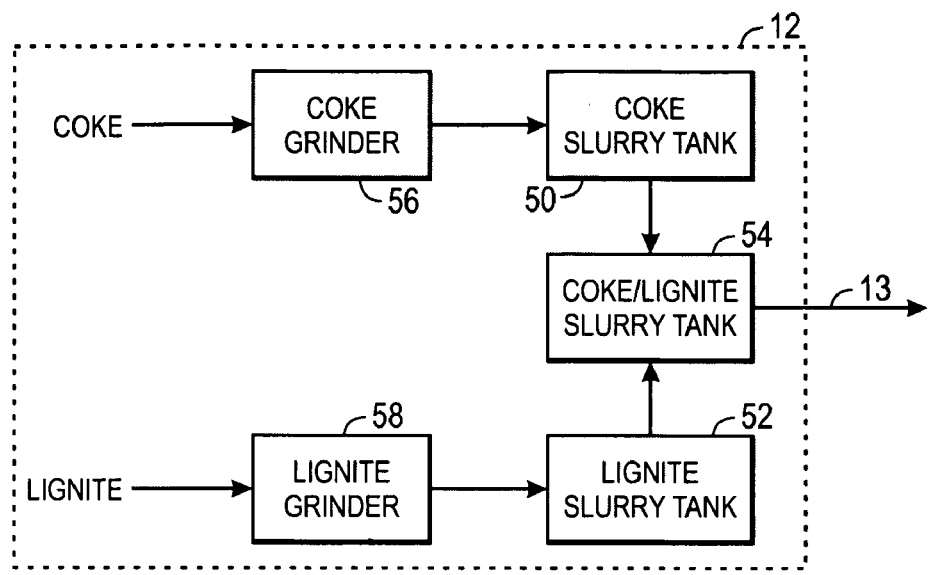
FIG. 2 is a block diagram of an exemplary gasification preparation and feed system as illustrated in FIG. 1 in accordance with embodiments of the present invention.

Turning to FIG. 2, a more detailed block diagram of the exemplary feedstock preparation and transportation system 12 of FIG. 1 is shown. In the illustrated embodiment, the system 12 may include at least three slurry tanks 50, 52, and 54. Because of the different properties of coke and lignite, each component may be slurried independently in tanks 50 and 52, respectively, and then combined in slurry tank 54 prior to gasification. Past attempts at slurrying lignite and coke together have been unsuccessful for several reasons. For example, coke is much harder than lignite and therefore is not as easily ground. That is, grinding a coke/lignite mixture results in non-uniform particle sizes because the lignite is finer than the coke when ground. Accordingly, the feed system 12 may include separate grinders 56 and 58 to grind the coke and lignite, respectively. In addition, lignite is much less stable than coke. That is, lignite absorbs much more water than coke. This instability leads to thickening of the lignite slurry over time. By preparing the coke and lignite slurries independently, the lignite slurry may be stabilized (e.g., rested until water is no longer being significantly absorbed by the lignite) in the lignite slurry tank 52 before being mixed with the coke slurry in the tank 54. In addition, it may be desirable to further stabilize the coke/lignite slurry in the tank 54 before feeding the slurry to the gasifier 14 (FIG. 1). The resulting coke/lignite slurry may be gasified as described above with respect to FIG. 1 even if the original lignite feedstock is non-gasifiable due to high moisture and/or ash content.

Figure 3:
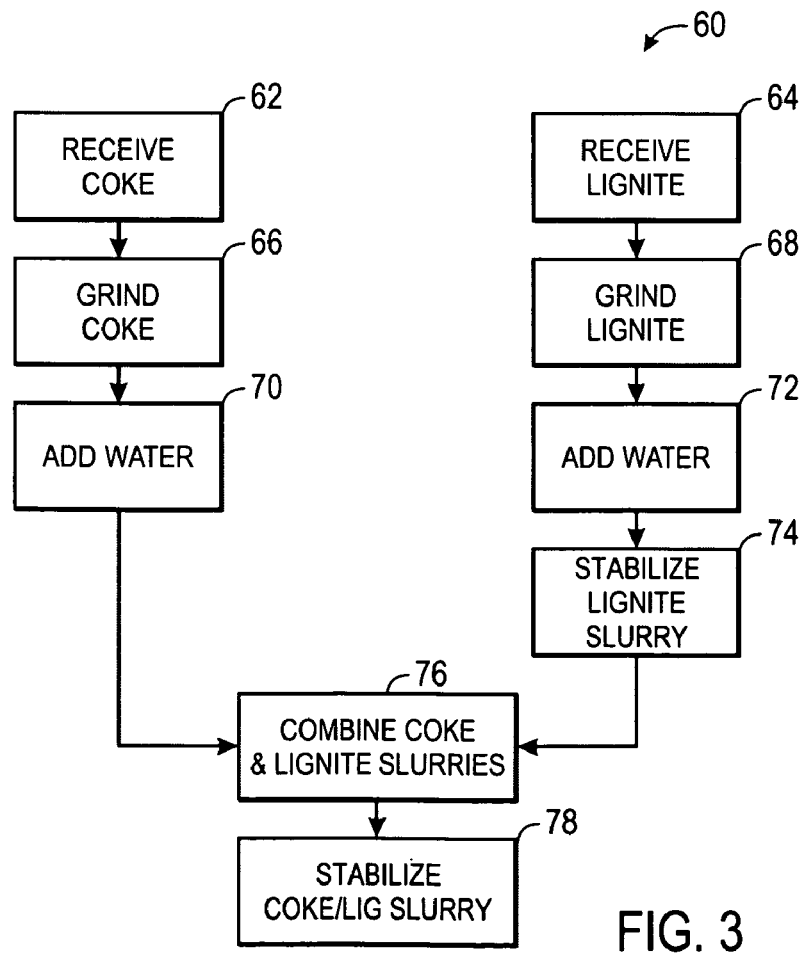
FIG. 3 is a flow chart of an exemplary process for preparing a coke/lignite slurry in accordance with embodiments of the present invention.

FIG. 3 illustrates a process 60 for producing a gasifiable coke/lignite slurry. The process may begin with receipt of coke (block 62) and lignite (block 64) for slurrification. In some embodiments, the coke may be produced, for example, by cracking heavy hydrocarbons or by baking bituminous coal in an airless furnace at very high temperatures (e.g., up to approximately 2,000° C.). The coke and lignite may then be ground separately (blocks 66 and 68, respectively). Because lignite is generally much softer than coke, the lignite grinding (block 68) may be much faster than the coke grinding (block 66). For example, a lignite batch of approximately 500 lbs may be ground (block 68) for approximately 30 minutes, whereas a coke batch of approximately 500 lbs may be ground (block 66) for approximately 50 minutes. In certain embodiments, the lignite grinding duration may be less than approximately 30, 40, 50, 60, or 70 percent of the coke grinding duration for an equivalent batch size.

The ground coke may then be mixed with water to form a coke slurry (block 70). Similarly, the ground lignite may be mixed with water to form a lignite slurry separate from the coke slurry (block 72). To form the slurries (blocks 70 and 72), the 500 lbs of ground coke may be mixed with approximately 120 gallons of water, and the 500 lbs of ground lignite may be mixed with 180 gallons of water. In certain embodiments, the water added to lignite may be greater than approximately 125, 150, 175, 200, 225, or 250 percent of the water added to coke for an equivalent batch size. Because the lignite is hydrophilic, it may absorb water from the slurry and atmospheric moisture, making the slurry denser over time. The lignite may continue to absorb water until it reaches an equilibrium moisture; accordingly, the lignite slurry may be rested in the lignite slurry tank until the lignite slurry is stabilized (e.g., the lignite reaches its equilibrium moisture) (block 74).

After the lignite slurry is stabilized, it may be mixed with the coke slurry in a coke/lignite slurry tank (block 76). In one embodiment, the coke slurry and lignite slurry may be mixed in an approximately even ratio to form a 50/50 coke/lignite slurry; in other embodiments, varying ratios of coke slurry to lignite slurry may be added to the coke/lignite slurry tank to generate other coke/lignite slurries. For example, approximately three portions of coke slurry may be combined with approximately two portions of lignite slurry to form a 60/40 coke/lignite slurry. Other coke/lignite slurries may be produced for gasification having, for example, coke/lignite ratios of approximately 90/10, 80/20, 70/30, 40/60, 30/70, 20/80, or any ratio which produces a gasifiable slurry. After the coke and lignite slurries are mixed (block 76), the coke/lignite slurry may be stabilized (block 78). Again, the stabilization process (block 78) may involve resting the coke/lignite slurry in the coke/lignite slurry tank until the mixture reaches moisture equilibrium. The slurrification process 60 may be performed at approximately room temperature and atmospheric pressure.

Experimental Results

Exemplary results of the slurryability of a coke/lignite mixture prepared as described above are discussed herein. An exemplary sample of petcoke may have a moisture content of approximately 5.68% as received, with an equilibrium moisture content of approximately 1.31%. The equilibrium moisture content indicates the moisture content at which the sample is neither gaining nor losing moisture from the atmosphere. The petcoke may have a gross heating value of approximately 15,015 BTU/lb and a grindability index of approximately 46 at approximately 0.46% moisture, as determined by ASTM D409 (Standard Test Method for Grindability of Coal by the Hardgrove-Machine Method). The mercury content of the petcoke may be less than approximately 0.01 µg/g. Additional approximate values of the ultimate analysis, proximate analysis, ash fusion, and ash analysis of the petcoke sample are presented in Tables 1-4, respectively.

An exemplary lignite sample for use in the preparation of the coke/lignite slurry may have a moisture content of approximately 29.90% as received and an equilibrium moisture content of approximately 28.55%. The gross heating value of the lignite sample may be approximately 8,982 BTU/lb. In addition, the grindability index of the lignite sample may be approximately 53 at approximately 12.45% moisture, as determined by the ASTM D409 standard, and the mercury content may be approximately 0.31 µg/g. The values of the ultimate analysis, proximate analysis, ash fusion, and ash analysis of the lignite sample are presented in Tables 1-4, respectively.

The ultimate analysis set forth in Table 1 is a measure of the components of the sample by weight percent on a dry basis, as determined by ASTM D3176 (Standard Practice for Ultimate Analysis of Coal and Coke). As noted, the ultimate analysis measurements are on a dry basis (e.g., excluding all moisture), therefore the values are corrected so that moisture content of the sample does not affect the composition values.

TABLE 1

Ultimate Analysis (weight percent, dry basis)

| Material | Petcoke | Lignite |
|---|---|---|
| Carbon | 86.71 | 49.5 |
| Hydrogen | 3.89 | 4.15 |
| Nitrogen | 1.51 | 0.94 |
| Sulfur | 6.48 | 1.23 |
| Ash | 0.37 | 30.17 |
| Chloride | <0.01 | <0.01 |
| Oxygen by difference | 1.04 | 14.01 |

Table 2 lists the proximate analysis measurements of the volatile, fixed carbon, and ash content of the sample, as determined by ASTM D3172 (Standard Practice for Proximate Analysis of Coal and Coke). The volatile content of the sample may be a measure of the components of the coal which may vaporize at a high temperature in the absence of air (e.g., short and long chain hydrocarbons, aromatic hydrocarbons, and sulfur). The fixed carbon content of the sample may be a measure of the components of the coal which are left after volatile mixtures are driven off. Further, the ash content of the sample may be a measure of the non-combustible components of the coal. Table 4 below shows exemplary components which may be included in the ash content of the coal sample. Again, proximate analysis is expressed in weight percent on a dry basis.

TABLE 2

Proximate Analysis (weight percent, dry basis)

| Material | Petcoke | Lignite |
|---|---|---|
| Volatile | 10.93 | 39.19 |
| Fixed Carbon | 88.7 | 30.64 |
| Ash | 0.37 | 30.17 |

The ash fusion values of the sample listed in Table 3 include the initial deformation temperature (IT), the softening temperature (ST), the hemispherical temperature (HT), and the fluid temperature (FT). The initial deformation temperate indicates the temperature at which the corners of the sample first become rounded. The softening temperature is the temperature at which the top of the sample begins to take on a spherical shape. The hemispherical temperature indicates the temperature at which the entire sample begins to take on a hemispherical shape. Finally, the fluid temperature is the temperature at which the sample has collapsed to a flattened mass.

TABLE 3

Ash Fusion Analysis (° F.)

| Value | Petcoke | Lignite |
|---|---|---|
| IT | 2669 | 2247 |
| ST | 2701 | 2312 |
| HT | 2701 | 2404 |
| FT | 2701 | 2537 |

Table 4 sets forth the ash analysis of the sample as a weight percent concentration normalized to a sulfur-free sample. That is, even though sulfur may be considered ash in some instances, the analysis provided in Table 4 is on sulfur-free basis.

TABLE 4

Ash Analysis (weight percent)

| Material | Petcoke | Lignite |
|---|---|---|
| $Al_2O_3$ | 4.63 | 22.31 |
| BaO | 0.04 | 0.10 |
| BeO | 0.00 | 0.00 |
| CdO | 0.00 | 0.00 |
| CaO | 1.43 | 7.96 |
| $Cr_2O_3$ | 0.04 | 0.01 |
| CoO | 0.06 | 0.00 |
| CuO | 0.00 | 0.01 |
| $Fe_2O_3$ | 3.49 | 4.86 |
| PbO | 0.00 | 0.00 |
| $MnO_2$ | 0.02 | 0.09 |
| MgO | 0.44 | 1.93 |
| $MoO_3$ | 0.52 | 0.00 |
| NiO | 10.00 | 0.02 |
| $P_2O_5$ | 0.05 | 0.06 |
| $K_2O$ | 0.39 | 1.21 |
| $Na_2O$ | 1.62 | 0.34 |
| $TiO_2$ | 0.26 | 1.08 |
| SrO | 0.04 | 0.20 |
| $V_2O_5$ | 65.23 | 0.10 |
| ZnO | 0.26 | 0.01 |
| $SiO_2$ | 11.48 | 59.69 |

The lignite sample described above may be slurried independently of the petcoke sample, as described in the present disclosure. The Stormer viscosity of the lignite slurry, as determined by ASTM D 562, is presented in Table 5. In one sample slurry, no additive was used, while approximately 0.2% ammonium lauryl sulfate (ALS) additive was added to another sample slurry, as indicated in Table 5. The Stormer viscosity measures the percent of solids in the slurry versus the viscosity of the slurry in centipoises (cP). As shown in Table 5, the ALS additive does not improve the slurryability of the lignite.

TABLE 5

Stormer Viscosity of Lignite Slurry
(solid percent as a function of slurry viscosity)

| Visc. (cP) | No Additive | 0.2% ALS |
|---|---|---|
| 1000 | 50.01 | 50.33 |
| 700 | 48.70 | 49.03 |
| 400 | 46.63 | 46.99 |
| 100 | 41.53 | 41.96 |

In addition, a sieve analysis of the sample lignite slurry is presented in Table 6. The sieve analysis measures the distribution of particle sizes in the slurry and is determined using ASTM D4749 (Standard Test Method for Performing the Sieve Analysis of Coal and Designating Coal Size). Each sieve number has a standard mesh size. For example, a No. 8 sieve has a mesh size of 2.360 mm, whereas a No. 325 sieve has a mesh size of 45 μm. Increasing sieve numbers indicate decreasing mesh sizes. The sieves may be stacked together, with the sieve having the largest mesh size at the top, and subsequent sieves having smaller mesh sizes. The weight percent of the slurry sample which remains in each sieve indicates the particle size distribution of the slurry. Particles which pass through even the smallest sieve mesh are indicated in the last row of Table 6. The results of the sieve analysis presented in Table 6 indicate that this lignite sample is very soft, and a high percentage of fine particles (e.g., particles which pass through a No. 325 sieve) are created with minimum grinding time.

TABLE 6

Sieve Analysis of Lignite Slurry (weight percent)

| Sieve # | % |
|---|---|
| 8 | 0.00 |
| 14 | 0.00 |
| 20 | 0.00 |
| 40 | 2.60 |
| 60 | 19.30 |
| 80 | 9.79 |
| 100 | 5.36 |
| 140 | 7.07 |
| 200 | 5.69 |
| 325 | 6.34 |
| −325 | 43.85 |

It should be noted that the sample lignite slurry as described in Tables 5 and 6 is not gasifiable, as indicated by the low concentration of solids in the slurry (Table 5). In addition, a large percentage of the solids that are present in the slurry are very fine (e.g., less than approximately 45 μm) (Table 6). The moisture content (approximately 28.55%) and the ash content (approximately 30.17%) in the lignite sample described in Tables 1-4 would generally be considered too high to attempt gasification because such a sample produces a non-gasifiable lignite slurry, as described above.

In accordance with embodiments of the present invention, the petcoke sample described above was also slurried and combined with the stabilized lignite slurry. Analyses of an approximately 50% coke/50% lignite slurry and an approximately 60% coke/40% lignite slurry are presented below. The Stormer viscosity values of the 50/50 slurry are presented in Table 7. In one sample, no additive was used, while in another sample 0.2% Orzan additive was added to the slurry. Slurry additives such as Orzan may be used to improve the homogeneity of the slurry mixture. Orzan, or lignosulfonic acid, sodium salt, may be obtained from Tembec Inc., Chemical Products, Montréal, QC, Canada. As indicated in Table 7, there is a marked improvement in the percentage of solids in the 50/50 coke/lignite slurry over the lignite slurry (Table 5). In addition, addition of the Orzan additive improved the solids percentage.

TABLE 7

Stormer Viscosity of 50/50 Coke/Lignite Slurry
(solid percent as a function of slurry viscosity)

| Visc. (cP) | No Additive | 0.2% Orzan |
|---|---|---|
| 1000 | 56.17 | 57.76 |
| 700 | 55.17 | 56.39 |
| 400 | 53.58 | 54.23 |
| 100 | 49.67 | 48.88 |

The sieve analysis of the 50/50 slurry is presented in Table 8. Again, the 50/50 coke/lignite slurry has a much lower percentage of fine particles than the lignite slurry (Table 6). For example, approximately 35.03% of the 50/50 coke/lignite slurry solids by weight are fine enough to pass through the No. 325 sieve, whereas in the lignite slurry (Table 6), approximately 43.85% of the slurry solids passed through the No. 325 sieve.

TABLE 8

Sieve Analysis of 50/50 Coke/Lignite Slurry

| Sieve # | % |
|---|---|
| 8 | 0.00 |
| 14 | 0.00 |
| 20 | 0.01 |
| 40 | 3.28 |
| 60 | 21.63 |
| 80 | 13.48 |
| 100 | 3.43 |
| 140 | 9.01 |
| 200 | 6.15 |
| 325 | 7.98 |
| −325 | 35.03 |

In addition, the ash fusion values of the 50/50 slurry are presented in Table 9.

TABLE 9

Ash Fusion Analysis of 50/50 Coke/Lignite Slurry (° F.)

| Value | Temp. |
|---|---|
| IT | 2251 |
| ST | 2322 |
| HT | 2410 |
| FT | 2574 |

As noted above, a 60/40 coke/lignite slurry was also prepared from the coke and lignite samples. The Stormer viscosity values of the 60/40 slurry are presented in Table 10. Again, no additive was used in one sample, while in another sample 0.2% Orzan additive was added to the slurry. Table 10 demonstrates that the 60/40 coke/lignite slurry presents an even greater improvement in solids percentage than the 50/50 coke/lignite slurry (Table 7) presented over the lignite slurry (Table 5).

TABLE 10

Stormer Viscosity of 60/40 Coke/Lignite Slurry
(solid percent as a function of slurry viscosity)

| Visc. (cP) | No Additive | 0.2% Orzan |
|---|---|---|
| 1000 | 58.95 | 61.67 |
| 700 | 57.53 | 60.25 |
| 400 | 55.30 | 58.03 |
| 100 | 49.77 | 52.53 |

The sieve analysis of the 60/40 slurry is presented in Table 11. Again, the 60/40 coke/lignite slurry has a lower percentage of fine particles than either the 50/50 coke/lignite slurry (Table 8) or the lignite slurry (Table 6).

TABLE 11

Sieve Analysis of 60/40 Coke/Lignite Slurry

| Sieve # | % |
|---|---|
| 8 | 0.00 |
| 14 | 0.00 |
| 20 | 0.04 |
| 40 | 5.07 |
| 60 | 23.54 |
| 80 | 10.24 |
| 100 | 8.50 |
| 140 | 6.42 |
| 200 | 6.96 |
| 325 | 6.85 |
| −325 | 32.38 |

Additionally, the ash fusion values of the 60/40 slurry are summarized in Table 12.

TABLE 12

Ash Fusion Analysis of 60/40 Coke/Lignite Slurry (° F.)

| Value | Temp. |
|---|---|
| IT | 2266 |
| ST | 2327 |
| HT | 2348 |
| FT | 2649 |

As demonstrated in Tables 1-12 above, combination of petcoke and lignite slurries in the disclosed embodiments clearly provides improvements over a lignite slurry alone. A high-moisture, high-ash lignite sample which generally would not be gasifiable was used in the production of a coke/lignite slurry with greatly improved gasability. Technical effects of the invention include the slurryability of lignite with coke for gasification, for example, in an IGCC system. The ability to gasify lignite in slurry enables the use of lignite in existing slurry gasification systems in which lignite previously could not be gasified.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A method, comprising:
 preparing a coke slurry;
 preparing a lignite slurry separate from the coke slurry; and
 combining the coke slurry with the lignite slurry to form a coke/lignite slurry.

2. The method of claim 1, wherein preparing the coke slurry comprises:
 grinding coke in a coke grinder; and
 combining the ground coke with water in a coke slurry tank to form the coke slurry.

3. The method of claim 1, wherein preparing the lignite slurry comprises:
 grinding lignite in a lignite grinder;
 combining the ground lignite with water in a lignite slurry tank to form the lignite slurry; and
 resting the lignite slurry in the lignite slurry tank to enable moisture equilibration of the lignite slurry.

4. The method of claim 1, wherein combining the lignite slurry with the coke slurry comprises:
 mixing the coke slurry and the lignite slurry in a combination slurry tank to form the coke/lignite slurry;
 resting the coke/lignite slurry in the combination slurry tank to enable moisture equilibration of the coke/lignite slurry.

5. The method of claim 1, wherein combining the coke slurry with the lignite slurry comprises combining approximately equal parts of the coke slurry with the lignite slurry to create approximately a 50% coke and 50% lignite slurry.

6. The method of claim 1, wherein combining the coke slurry with the lignite slurry comprises combining approximately three parts of the coke slurry with approximately two parts of the lignite slurry to create approximately a 60% coke and 40% lignite slurry.

7. The method of claim 1, comprising adding lignosulfonic acid, sodium salt to the coke/lignite slurry.

8. The method of claim 1, comprising gasifying the coke/lignite slurry.

9. The method of claim 8, comprising using syngas generated from the gasification of the coke/lignite slurry to produce electricity.

10. The method of claim 1, wherein preparing the coke slurry comprises:
 grinding coke in a coke grinder; and
 combining the ground coke with water in a coke slurry tank to form the coke slurry; and
 wherein preparing the lignite slurry comprises:
 grinding lignite in a lignite grinder;
 combining the ground lignite with water in a lignite slurry tank to form the lignite slurry; and
 resting the lignite slurry in the lignite slurry tank to enable moisture equilibration of the lignite slurry.

11. The method of claim 1, wherein the lignite slurry comprises a lignite having a moisture content of at least approximately 29% and an ash content of at least approximately 30%.

12. The method of claim 1, comprising:
 preparing the coke slurry in a coke slurry tank of a slurry preparation system;
 preparing a lignite slurry separate from the coke slurry in a lignite slurry tank of the slurry preparation system; and
 combining the coke slurry with the lignite slurry to form a coke/lignite slurry in a coke/lignite slurry tank of the slurry preparation system.

13. A method, comprising:
 producing a coke/lignite slurry from lignite having a moisture content of at least approximately 29% and an ash content of at least approximately 30%, wherein producing the coke/lignite slurry comprises combining a coke slurry with a lignite slurry.

14. The method of claim 13, comprising gasifying the coke/lignite slurry.

15. The method of claim 13, wherein the lignite slurry comprises a stabilized lignite slurry.

16. The method of claim 13, wherein the coke/lignite slurry comprises approximately 50% coke slurry and 50% lignite slurry.

17. The method of claim 13, wherein the coke/lignite slurry comprises approximately 60% coke slurry and 40% lignite slurry.

* * * * *